May 31, 1960     V. J. LUNDELL     2,938,326
HAY CHOPPER

Filed May 18, 1956     2 Sheets-Sheet 1

INVENTOR.
Vernon J. Lundell
BY
Sam J. Slotaby
ATTORNEY

May 31, 1960  V. J. LUNDELL  2,938,326
HAY CHOPPER
Filed May 18, 1956  2 Sheets-Sheet 2
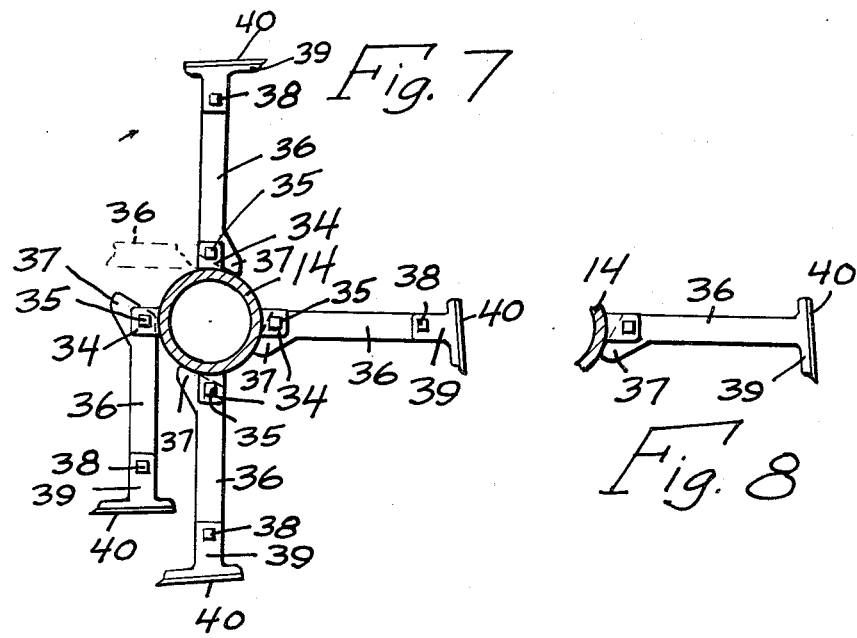
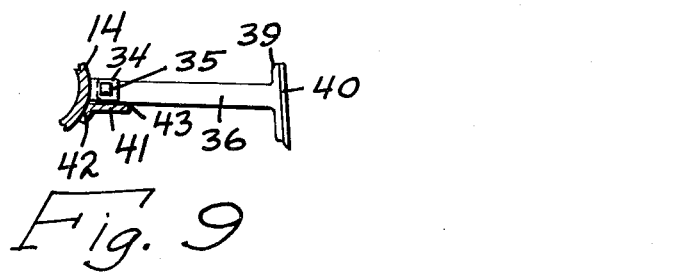
INVENTOR.
Vernon J. Lundell
BY
Sam J. Slotsky
ATTORNEY

United States Patent Office 2,938,326
Patented May 31, 1960

2,938,326

HAY CHOPPER

Vernon J. Lundell, Cherokee, Iowa

Filed May 18, 1956, Ser. No. 585,674

1 Claim. (Cl. 56—504)

My invention relates to hay choppers.

An object of my invention is to provide certain rotating chopping and gathering members for such hay choppers, and to provide such members in a variety of forms which efficiently perform the operation of gathering and chopping the crop in the field, and thence delivering the same.

A further object of my invention is to provide radially positioned members of this type which can be manufactured at a reasonable cost.

A further object of my invention is to provide these arrangements wherein the members are pivotally and resistantly mounted for the purposes intended.

Figure 1:
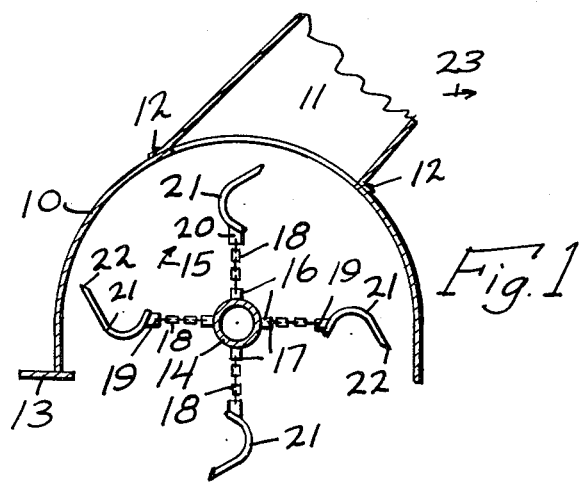
Figure 2:
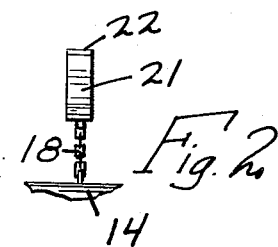
Figure 3:
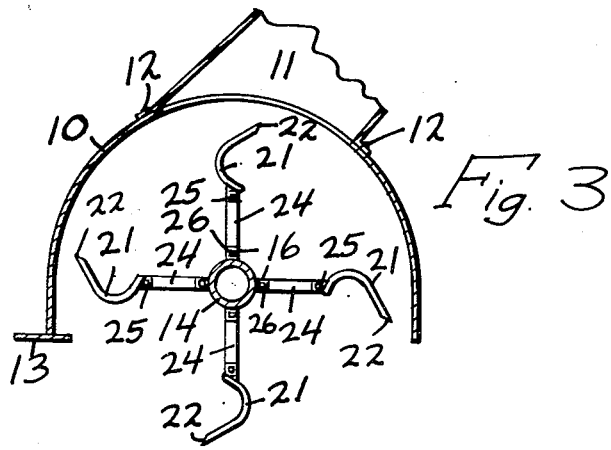
Figures 5, 6:
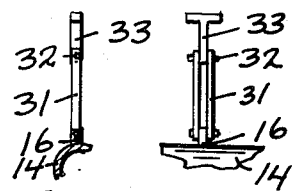
Figure 4:
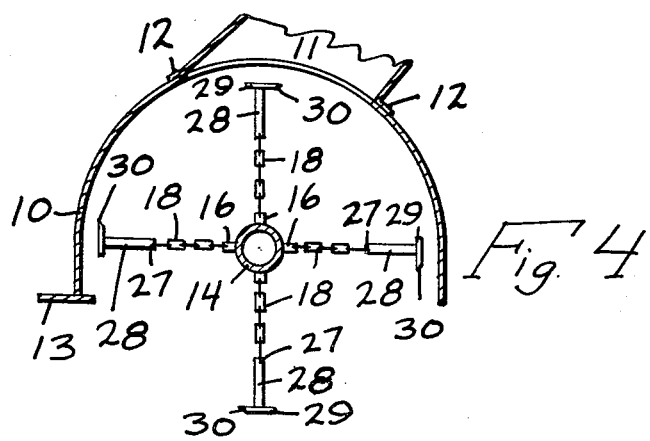

With these and other objects in view, my invention consists in the construction, arrangement, and combination of the various parts of my device, whereby the objects contemplated are attained, as hereinafter more fully set forth, pointed out in my claim, and illustrated in the accompany drawings, in which:

Figure 1 is a cross section of the casing and shaft as well as certain other portions of a hay chopper using my invention and showing a certain type of such radially positioned members, Figure 2 is an end view of one of the members, Figure 3 is a further sectional view showing a further form of such members, Figure 4 is a further section showing a still further form of such members, Figure 5 is an end view of a further form of such members, Figure 6 is an end view of Figure 5, Figure 7 is a further form or modification of such members, Figure 8 is a modification somewhat similar to Figure 7, and Figure 9 is a further modification of such members.

I have used the character 10 to designate a cross section of a semi-cylindrical casing which is horizontally mounted and which is positioned laterally to the direction of travel of a hay chopper, these hay choppers being of that type which are adapted to gather material from the ground, chop the same and thence deliver the same exteriorly of the casing, the character 11 indicating a discharge housing attached at 12, whereby the material which is gathered and chopped is discharged through this housing, the balance of the mechanism of these hay choppers not being necessarily shown herein since they are known in the art. The character 13 indicates a bar attached to the casing to assist in the chopping action, however this bar need not be used.

The character 14 indicates a pipe or shaft which is suitably driven to rotate in the direction of the arrow 15. Attached to the pipe or shaft 14 are the lugs 16 to which are attached at 17 the short chains 18 which in turn are attached at 19 to the further lugs 20 which lugs 20 are attached to the arcuate bars 21 having the sharpened edges 22.

As the unit travels forwardly in the direction of the arrow 23, the rotation of the shaft 14 will cause the members 21 to gather the material from the field, and thence chop the material as it travels about within the casing, the rapid rotation of the members additionally ejecting the material through the member 11 into a wagon or any other desired receptacle, it being understood however that the material could also be transferred to conveyors or other mechanisms, the essential spirit of the present invention residing in the radially positioned members 18 and 21. The arcuate members 21 also permit the material to be gathered and chopped in a highly efficient manner.

The provision of the chains in the manner described insures that the momentum effects are centrifugally applied at the outer ends of the radially disposed members, and in cases where undesired obstacles are encountered, the use of the chains will allow the members 21 to give without injuring the machine.

Figure 3 illustrates a further modification wherein identical characters indicate identical parts, and in this modification links 24 are used which are pivoted at 25 and 26, the arrangement operating in a substantially similar manner and with the links permitting articulation at the necessary points.

Figure 4 illustrates a further form in which the chains 18 are attached at 27 to the bars 28 and attached at the terminals of the bars 28 are the blades 29 having the sharpened edges 30, which blades can be rectangular or which can be triangular, this modification also performing similar functions.

Figure 5 illustrates a further somewhat similar form in which a pair of links 31 are pivoted to the lugs 16, or if desired only one link can be used on each radially positioned member, the links 31 being pivoted at 32 to the T-section members 33, or the T-section members could be replaced with straight bars.

Figures 7 to 9 inclusive illustrate a still further modification wherein the rotating hammers or bars are prevented from striking against each other when the shaft or pipe member 14 ceases its rotation.

In these forms the character 34 indicates ears secured to the pipe 14 and pivotally attached at 35 thereto are the extending hammer members 36 having the offset portions 37.

Pivotally secured at 38 to the members 36 are the end members 39 having the blade portions 40.

It will be noted that by virtue of the offset portions 37, when the shaft or pipe member 14 ceases its rotation, these offset portions 37 will maintain the right-hand member 36 of Figure 7 in the radial position shown, and with the other hammer members 36 being approximately as shown with the left-hand member falling to the vertical position. The upper and lower members 36 will also be approximately vertical as shown, and if the upper member 36 falls to the dotted position shown, due to the pivotal attachment at 34 and the relationship of this pivotal attachment to the pipe 14, the member 36 will not be able to travel rearwardly to a greater distance than that shown in the dotted position, so that as a result when the device is stopped, there will be no injurious effects caused by the various hammer portions striking each other and at the same time the hammer members will be permitted to move rearwardly against the direction of rotation for the purpose of resistingly contacting harder objects and the like.

Figure 8 illustrates a modification wherein the hammer 36 is not pivoted at 38 but merely continues solidly into the portion 39 and also uses the offset portion 37.

Figure 9 illustrates a form wherein the hammer members 36 will not include the offset portion, however a laterally continuous member 41 is attached at 42 to the pipe 14, there being a member 41 slightly ahead of each series of laterally spaced hammers 36. In this way a single lengthened member 41 will accomplish the same results as the offset member 37, since each hammer 36 will abut at 43, thereby providing a similar result. The members 41 can be made of angle iron or any other shape, and it should also be understood that other stop members could be employed as well.

It will now be noted that I have provided the advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

In combination with the transversely mounted shaft of a hay chopper having an upper discharge spout, a plurality of radially positioned members secured to said shaft, said radially positioned members being articulated throughout their lengths, arcuate members attached at the outer terminals of said articulated members, said arcuate members including sharpened ends, means for rotating said shaft, the concavity of said arcuate members facing the direction of movement of said shaft during the upper travel of rotation of said arcuate members, said arcuate members including substantially straight end portions, said end portions being positioned at an angle substantially greater than 90° with respect to said articulated members to eject material off of said ends, and into said spout.

References Cited in the file of this patent
UNITED STATES PATENTS

| | | |
|---|---|---|
| 2,170,407 | Hartshorn | Aug. 22, 1939 |
| 2,506,054 | Agee et al. | May 2, 1950 |
| 2,545,590 | Settergren et al. | Mar. 20, 1951 |
| 2,691,262 | Swertfeger | Oct. 12, 1954 |